United States Patent [19]
Langworthy et al.

[11] Patent Number: 5,771,669
[45] Date of Patent: Jun. 30, 1998

[54] METHOD AND APPARATUS FOR MOWING IRREGULAR TURF AREAS

[75] Inventors: Thomas F. Langworthy, Cologne; Herman P. Christopherson, Prior Lake; Richard A. Nelson, Bloomington, all of Minn.

[73] Assignee: The Toro Company, Bloomington, Minn.

[21] Appl. No.: 672,157

[22] Filed: Jun. 27, 1996

[51] Int. Cl.[6] .................................................. A01D 75/30
[52] U.S. Cl. .............................. 56/6; 56/15.8; 56/DIG. 10
[58] Field of Search .............................. 56/6, 14.9, 15.9, 56/15.6, 15.7, 15.8, 320.1, 320.2, DIG. 14, DIG. 3, DIG. 10

[56] References Cited

U.S. PATENT DOCUMENTS

| | | | |
|---|---|---|---|
| 2,259,553 | 10/1941 | Clapper | 56/7 |
| 2,682,740 | 7/1954 | Miller et al. | 56/6 |
| 2,753,674 | 7/1956 | Cunningham et al. | 56/6 |
| 2,952,961 | 9/1960 | Engler | 56/25.4 |
| 3,068,630 | 12/1962 | Caldwell | 56/6 |
| 3,070,938 | 1/1963 | Winget | 56/6 |
| 3,135,079 | 6/1964 | Dunn | 56/6 |
| 3,473,302 | 10/1969 | Caldwell | 56/6 |
| 4,497,160 | 2/1985 | Mullet et al. | 56/6 |
| 4,601,162 | 7/1986 | Wessel | 56/13.6 |
| 4,711,072 | 12/1987 | Aldred | 56/6 |
| 5,109,655 | 5/1992 | Tekulve | 56/6 |
| 5,113,640 | 5/1992 | Colistro | 56/6 |
| 5,133,176 | 7/1992 | Baumann et al. | 56/17.4 |
| 5,161,353 | 11/1992 | Bergkamp et al. | 56/6 |
| 5,233,817 | 8/1993 | Nicol | 56/6 |
| 5,249,411 | 10/1993 | Hake | 56/11.6 |
| 5,343,683 | 9/1994 | Friesen | 56/320.1 |
| 5,628,169 | 5/1997 | Stiller et al. | 56/7 |

*Primary Examiner*—Tamara L. Graysay
*Assistant Examiner*—Thomas A. Beach
*Attorney, Agent, or Firm*—John F. Klos

[57] ABSTRACT

A rotary turf mower (32) suitable for mowing irregular turf areas including a cutting system (60) which includes a plurality of cutting units (102) which are movable over the ground and each carrying at least one cutting blade (114), and a coupler (140) including a span member (144) and a pair of hinges means (150) for interconnecting adjacent cutting units (102), wherein each hinges (150) permits relative pivotal movement about a hinge axis (160), and wherein the hinge axes (160) associated with adjacent cutting units (102) are non-parallel, whereby each cutting unit may display a range of independent motion relative to an adjacent cutting unit. One embodiment of the present invention provides that the hinge axes associated with each span member are substantially directed to a virtual pivot point (184), whereby the motion of adjacent cutting units (102) relative to the virtual pivot point (184) is generally rotational. Tip-to-tip distance variation between adjacent cutting blades (114) is substantially minimized in the preferred mower by positioning the virtual pivot point (184) between adjacent cutting units (102) and substantially at the intersection of adjacent cutting planes (122). A preferred mower also includes multiple degrees of freedom between adjacent cutting units (102), wherein "pitching" and "rolling" type motions are permitted between adjacent cutting units (102).

25 Claims, 7 Drawing Sheets

METHOD AND APPARATUS FOR MOWING IRREGULAR TURF AREAS

TECHNICAL FIELD

The present invention relates broadly to turf maintenance machines having cutting systems including multiple cutting units, and more particularly to an approach for interconnecting adjacent cutting units in order to achieve improved efficiency and quality of cut.

BACKGROUND OF THE INVENTION

Mid and large size commercial turf mowing machines have long been known in the industry for providing a high quality and efficient cut on relatively flat and unobstructed terrain. The wide cutting swath typical of these mowers allows for productive cutting of large turf areas such as golf courses, parks and the like. However, the prior art mowers typically are unable to provide the same high quality of cut when mowing highly contoured terrain, severe mounds, and other irregular areas. This invention relates to a mechanism and method used to interconnect cutting units in a multiple cutting unit configuration in a manner providing high quality and efficient grass cutting on a variety of flat or contoured terrain.

Mid and large size turf mowers typically include a steerable traction vehicle supported by a plurality of wheels and powered by a prime mover. Grass cutting units are typically attached to the traction vehicle and are normally driven via an arrangement of belts or hydraulic motors. Grass is cut in a swath as the tractor and attached cutting units move across the ground. Mid and large size turf mowers can generally be classified according to the position of the cutting unit(s) with reference to the traction vehicles. The cutting units may be positioned behind the traction vehicle in a towed or "gang" configuration, may be positioned underneath the traction vehicle suspended between the plurality of traction vehicle wheels in a "belly-mount" configuration, may be positioned from the sides of the traction vehicle in a "wing-mount" configuration, or may be positioned ahead of the traction vehicle in an "out-front" configuration. Some large size turf mowers include a combination of out-front, belly-mount, and wing-mount cutting units to achieve a relatively wide cutting swath.

Mid and large size turf mowers may also be classified according to the cutting unit type. Two common configurations of cutting units include reel cutting units and rotary cutting units. Reel cutting units typically include a frame holding a rotating cutting reel possessing a plurality of helical blades, the reel rotating about a generally horizontal axis (when the cutting unit is on level ground). Severing of the vegetation occurs from the interaction of the reel and a stationary bed knife. Common rotary cutting units usually include one or more relatively straight, rigid blades rotatably carried beneath a cutting unit, the blades rotating about generally vertical axes (when the cutting unit is on level ground). Vegetation is severed at a predetermined height above the ground by impact with the generally horizontally rotating cutting blade(s).

Of the various configurations of turf mowers outlined above, out-front rotary mowers are becoming particularly popular. Examples of this type of mowing machine include the GROUNDSMASTER ® models sold by The Toro Company, assignee herein. This configuration of mower is highly regarded for combining a traction vehicle with excellent handling, maneuverability and traction characteristics with a rotary cutting unit having improved trimability as compared with other configurations, such as the towed-behind or belly-mount arrangements. These out-front mowers also provide beneficial lines-of-sight contributing to a safe mowing operation.

While the present invention will be described with reference to an out-front rotary mower, the application of the present invention to other mower types and configurations is envisioned by the Applicants and is encompassed by the present invention.

Out-front rotary mowers having a large single rotary cutting unit comprising multiple cutting blades that are positioned generally adjacent each other in a single inflexible housing have existed for some time. Such mowers can be termed "multi-blade rigid deck" mowers. Prior art multi-bladed rigid deck mowers have long realized the benefits of increased efficiency and productivity achieved from having multiple cutting blades associated with a given traction vehicle. A simple multi-bladed rigid deck mower includes a single large mower deck or housing having top and side walls and rotatably carrying the cutting blades in a generally side-by-side or slightly staggered fashion underneath the mower deck. For example, a rotary cutting unit of this configuration is disclosed in U.S. Pat. No. 5,133,176, assigned to The Toro Company, the assignee herein. For generally flat terrain, the after-cut appearance of grass mowed with such a multi-bladed rigid housing mower is acceptable.

Large multi-bladed rigid housing mowers are oftentimes unsuited for use on severe terrain, including hills, undulations, highly sloped regions, and other irregular areas typically found within golf courses around greens and elevated tee boxes. Scalping, skipping and streaking of grass often occur when using large multi-bladed rigid housing mowers on severe terrain. Held within an inflexible housing, the individual cutting blades are simply unable to conform to the immediate terrain beneath each cutting blade. Rather, the large single cutting unit severs the grass to an average height across the entire housing width. Consequently, small bumps or upwardly sloping regions that pass underneath the cutting unit may be scalped while depressions or downwardly sloping regions may be undercut or entirely missed. The prior art has addressed the disadvantages of large single cutting unit mowers, usually by segmenting the relatively wide cutting unit into a plurality of narrower cutting units each carrying one or sometimes two rotary cutting blades. A flexible mechanism is then commonly provided to interconnect the separate cutting units whereby the individual cutting units can more closely follow the terrain passing immediately beneath each cutting unit. The present invention relates to an improved mechanism for interconnecting individual, relatively narrow cutting units.

Mowing systems having multiple adjacent cutting units each adapted for some degree of independent travel have existed in one form or another for some time. For example, U.S. Pat. No. 2,952,961 discloses a mowing system comprised of three mowing units in a gang configuration wherein the three cutting units are pivotally connected together with a piano-type linear hinge positioned between the adjacent cutting units. Similarly, The Toro Company, assignee herein, manufactures an out-front Triflex mowing system having three cutting units which are pivotally connected with simple linear hinges. Many such prior art flexible multiple cutting unit mowing systems are similarly interconnected with piano-type or other simple linear hinges. Many prior art mowing systems have three adjacent cutting units; a center unit and two side wing units with the linear hinges connecting the side units to the center unit and generally being aligned parallel with the longitudinal axis of the mowing machine (in the direction of travel). Such linear hinge interconnections are said to provide a single degree-of-freedom relationship between adjacent cutting units. As a type of single degree-of-freedom mechanism the movement of one cutting unit with relation to the adjacent cutting unit is generally purely rotational about the hinge axis. With the linear hinges being aligned generally parallel to the longitudinal machine axis, some terms of aviation may be adopted to describe the cutting unit motion. Generally only a "rolling" motion of one cutting unit with relation to an adjacent cutting unit is permitted with such an interconnect configuration (rotational motion about an axis generally parallel to the longitudinal axis). The prior art linear hinge cutting unit interconnections generally constrain the relative motion between adjacent cutting units from exhibiting "pitching" or "yawing" motions, i.e., motions between adjacent cutting units about a generally horizontal transverse axis (generally perpendicular to the longitudinal axis described above) and about a generally vertical axis, respectively.

Figure 12A:
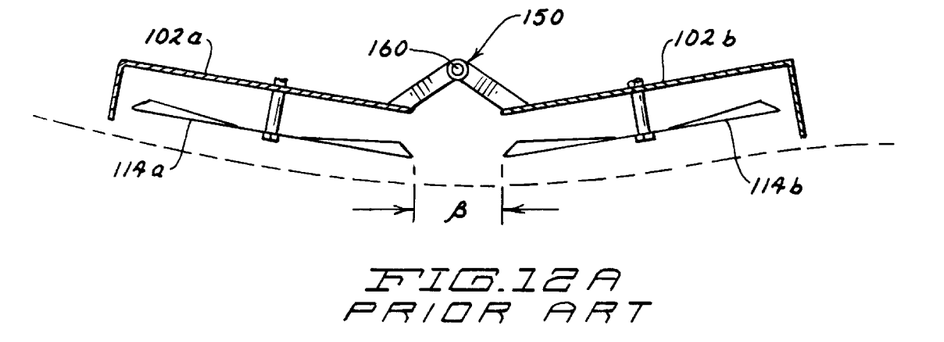
FIG. 12a is a diagrammatic front elevational view of a prior art cutting system, depicted in operation over uneven terrain.
Figure 12B:
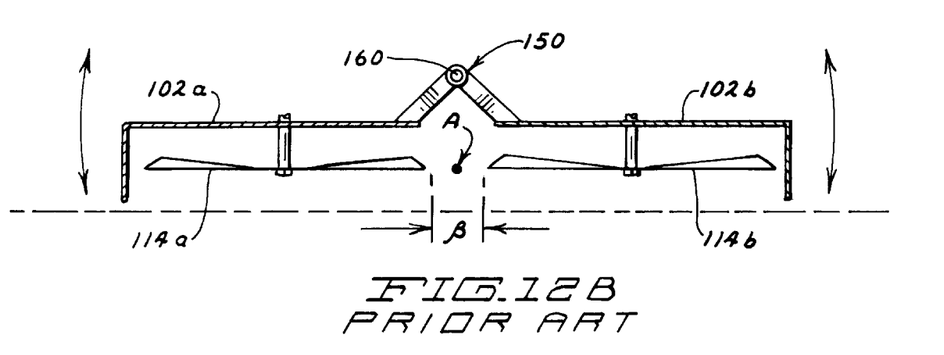
FIG. 12b is a diagrammatic front elevational view of a prior art cutting system, depicted in operation over level terrain.
Figure 12C:
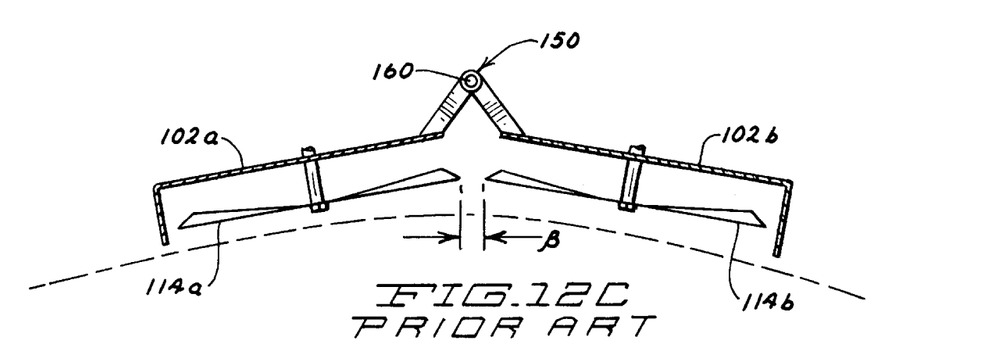
FIG. 12c is a diagrammatic front elevational view of a prior art cutting system, depicted in operation over uneven terrain.

A significant limitation of prior art linearly hinged cutting systems is a varying minimum distance between adjacent cutting blades during operation. Diagrammatically shown in FIG. 12 is a simple linearly hinged cutting system, viewed from the front, having adjacent cutting units 102 each having a rotating cutting blade 114. To aid in the discussion of prior art mowing systems, the distance $\beta$ of FIG. 12 is simply the tip-to-tip distance between adjacent cutting blades 114. FIGS. 12a and 12c depict a "rolling" motion between adjacent cutting units 102 permitted by the linear hinge interconnection 150. The linear hinge 150 positioned above the cutting blades 114 provides a single degree-of-freedom connection between adjacent cutting units 102 and constrains the adjacent units 102 to exhibit only pivotal or rotational motion about a hinge axis 160 (here simply through the center of the linear hinge 150). As a result, when the adjacent cutting units 102 spread apart as shown in FIG. 12a (as when mowing within a small valley or depression) the $\beta$ distance increases. Similarly, when the adjacent cutting units 102 bow in as shown in FIG. 12c (as when mowing over a small hill) the $\beta$ distance between adjacent cutting blades 114 decreases. The amount of $\beta$ distance variation in uneven terrain operation is directly related to the position of the linear hinge 150 above the cutting blades 1 14. The greater the distance between the hinge axis 160 and the cutting blades 114 the more pronounced the $\beta$ variation for operation over a given uneven terrain.

Designers in this art are challenged, for a given cutting unit and linear hinge geometry, by the $\beta$ distance variation which is present during mowing operations over uneven terrain. Obviously, too small a $\beta$ distance may result in dangerous contact between adjacent cutting blades. Likewise, too large a $\beta$ distance may result in unsatisfactory streaking of grass. "Streaks" are strips of uncut grass left generally between adjacent blade orbits (in the $\beta$ region) when turning or operating in severe terrain. In the effort to satisfy the design criteria of preventing blade contact while minimizing streaking the prior art discloses generally two approaches. The first approach, now almost universally rejected on a cost and complexity basis, limits the potential of blade contact and streaking by synchronizing adjacent blades. In this approach the cutting units are generally positioned in a side-by-side manner and are operatively driven through a timed chain or a gear arrangement which prevents adjacent cutting blade contact even though the blade orbits overlap. U.S. Pat. No. 2,753,674 to Cunningham, et al., assigned to The Toro Company, assignee herein, shows such an apparatus. The other more accepted design approach of multiple interconnected mowing systems is to longitudinally stagger or offset the cutting units. The Triflex "swept-back" or "delta-winged" cutting system manufactured by The Toro Company, assignee herein, is representative of the popular staggered cutting unit mowing systems. The stagger or offset of adjacent cutting units usually results in cutting unit overlap, defined as the region common to adjacent cutting units as the cutting system moves in the direction of travel. As the cutting system traverses the ground, grass passing underneath the overlap region may be contacted by both adjacent cutting blades, or "double-cut" Although an amount of overlap is generally regarded as helpful to limit the streaking potential between adjacent cutting units, additional overlap represents an inefficiency of the cutting system as the lateral width of the cutting system is reduced by the total overlap amount. The opportunity to optimize the overlap amount for many prior art cutting systems is frustrated by the $\beta$ distance variation resulting from the prior art linear hinge cutting unit interconnections.

It can be appreciated that the amount of stagger or overlap helpful to limit streaking in many prior art cutting systems varies depending on the terrain conditions. For many prior art linearly hinged cutting systems a generally direct relationship exists between the amount of overlap helpful to limit streaking and the $\beta$ distance between adjacent cutting blades. Less overlap may be desired for operation over level terrain or over small hills (see FIGS. 12 b & c), while larger overlap may be desired for operations in valleys and the like as depicted in FIG. 12 a, where the $\beta$ distance is much larger. A typical prior art solution to this inquiry has been to select a suitably large overlap such that the streaking potential is minimized during operations over most encountered terrain, but at the cost of mower inefficiency during operations where less overlap may be desired. As a consequence of the $\beta$ or tip-to-tip distance variation associated with many prior art linearly hinged cutting systems, the overlap amount may not be optimized over all mowing terrain. Thus, for many prior art mowers there exists an inherent operational inefficiency when mowing where the overlap amount between adjacent cutting units is larger than desired and an inherent streaking potential when operating over some more severe terrain where the overlap may be insufficient. The present invention minimizes the streaking potential and operational inefficiency by substantially eliminating the $\beta$ or tip-to-tip distance variation between adjacent cutting blades. The present invention thus provides the potential to optimize the stagger or overlap between adjacent cutting units in this popular cutting system configuration.

The prior art does not teach an acceptable approach to limit the , distance variations in flexibly interconnected mowing systems. Ideally one approach to avoid the tip-to-tip variation would position the hinge interconnection between the adjacent cutting units at a cutting plane level, i.e., at the point indicated with the reference letter "A" in FIG. 12b. However, in order to locate a traditional hinge at this point the distance between adjacent cutting units would have to be dramatically increased, necessitating a greatly increased deck stagger. Furthermore, a hinge connection positioned near the cutting plane level would be subject to an extremely harsh environment. The prior art fails to teach a hinging interconnection for the staggered-style cutting system which limits the $\beta$ distance variation by providing a pivotal connection between adjacent cutting units that is positioned near the cutting plane level.

Another general limitation of linearly hinged interconnected cutting unit mowing systems is the inability of the individual cutting units to display "pitching" motions. The typical linear hinge constrains the adjacent cutting units and prevents pivotal motion about a lateral transverse axis, or pitching. Applicants have found that some degree of pitching motion of the cutting units may help to achieve a high quality of cut in severe terrain operations. One preferred embodiment of the present invention provides an interconnection with an additional degree of freedom which permits the individual cutting units to exhibit both relative rolling and pitching motions.

Multiple degree of freedom cutting systems are known. U.S. Pat. No. 3,135,079 to Dunn shows a gang mowing apparatus having a sectional mowing system comprised of three rotary cutting units wherein, instead of a linear hinge interconnection between adjacent cutting units, each cutting unit is connected to a frame member through a ball and socket means. Each cutting unit is mounted for limited movement as dictated by the terrain around either a longitudinal or transverse axis (rolling and pitching, respectively). This relatively complex gang mounting scheme is not easily applied to an out-front cutting system, a preferred configuration for many high-precision mowers. More importantly, the motion between adjacent cutting units is rotational about a pivot point (positioned within the ball and socket means) that is a relatively far above the cutting plane and, as a result, the p distance between adjacent cutting units is variable with the terrain.

Pat. No. 5,109,655 to Tekulve shows another gang mowing apparatus having a sectional mowing system comprised of a plurality of cutting units. This patent discloses a post and swivel sleeve pivotal attachment means for connecting adjacent cutting units. The post and swivel sleeve arrangement of Tekulve (conceptually a universal joint with two degrees of freedom) is positioned much above the adjacent cutting units. The relative motion between adjacent cutting units is rotational and occurs about the pivot point located within the post and swivel sleeve arrangement. As a result of the pivot point being positioned away from the cutting plane level, the $\beta$ distance of adjacent cutting units of this apparatus varies considerably during uneven terrain operation.

A need therefore has arisen to develop an apparatus whereby the $\beta$ or tip-to-tip distance variation between adjacent cutting blades is minimized; and whereby, in a preferred embodiment, an additional degree of freedom between the cutting units is provided. Applicants believe that the limitations associated with the prior art linear hinge interconnected cutting systems are particularly addressed by the present invention. Specifically, the present invention is directed to a cutting system which includes a plurality of cutting units having minimal $\beta$ distance variation; and in a preferred embodiment, includes the ability to exhibit pitching-type motions.

SUMMARY

Accordingly, one aspect of the present invention includes a cutting system suitable for use with a traction vehicle, including a plurality of individual cutting units which are movable over the ground and each carrying at least one cutting blade; a span member associated with and disposed between each pair of adjacent cutting units; and a pair of hinging means for pivotally connecting each span member to adjacent cutting units, whereby each hinging means permits relative pivotal movement about a hinge axis, and wherein the hinge axes associated with each span member are generally non-parallel. One embodiment of the present invention provides that the hinge axes associated with each span member are substantially directed to a virtual pivot point, whereby the motion of adjacent cutting units relative to the virtual pivot point is generally rotational. Another embodiment of the invention broadly provides that each virtual pivot point be located between adjacent cutting units and substantially near the intersection of adjacent cutting planes, whereby the $\beta$ or tip-to-tip distance variation between adjacent cutting units is substantially minimized.

Another embodiment of the invention broadly includes a cutting system providing multiple degrees of freedom between adjacent cutting units, whereby each cutting unit may display motions relative to adjacent cutting units. Still another aspect of the present invention includes a cutting system including a plurality of cutting units, whereby the permitted motions of each cutting unit relative to adjacent cutting units includes both "pitching" and "rolling" type motions.

Additional features and aspects of the invention are described in detail below with reference to the Drawings.

BRIEF DESCRIPTION OF THE DRAWINGS

The invention will be further described with reference to the Drawings, wherein.

DETAILED DESCRIPTION OF A PREFERRED EMBODIMENT

Figure 1:
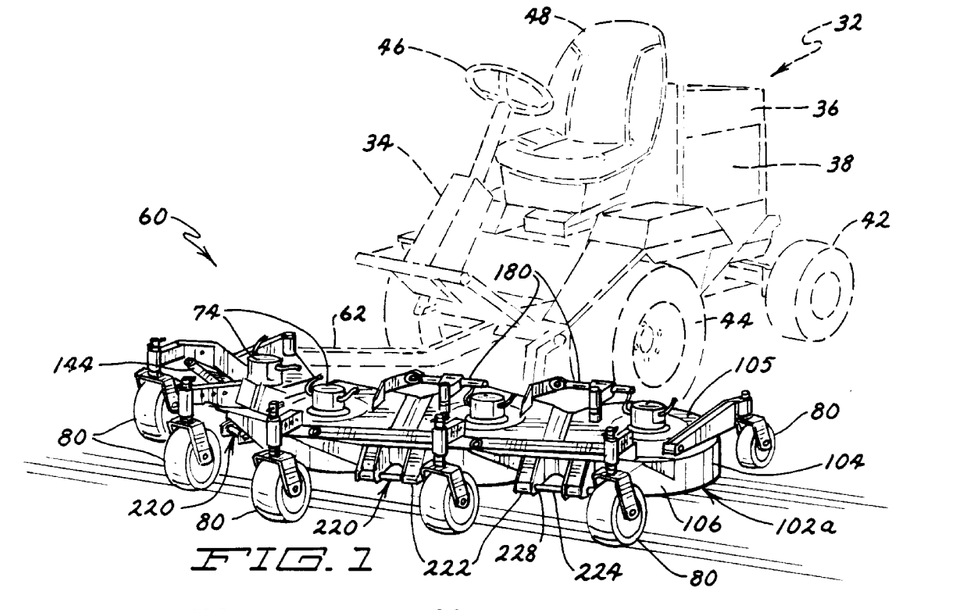
FIG. 1 is a perspective view of a mower according to the present invention, particularly showing the cutting system.

Referring now to the Drawings, wherein like reference numerals designate like parts and assemblies throughout the several views, and particularly referring to FIG. 1, there is shown a turf maintenance machine 32 of the type with which the invention herein is particularly useful. Such a mowing machine 32 is typically utilized for cutting relatively large areas such as parks and golf courses. Machine 32 is a preferred, not the exclusive, embodiment of the invention.

The mowing machine 32 includes a traction vehicle 34 which includes a rear is 5 housing 36 enclosing an engine 38 which is coupled via a transmission (not shown) to a pair of front drive wheels 44. The operator sits in a seat 48 positioned in front of the engine housing 36 and controls the operation of the machine 32 by means of hand and foot controls (not shown) and a steering wheel 46 which is coupled to a pair of rear steering wheels 42. The rear wheels 42 are generally smaller in both diameter and tread width for purposes of better maneuverability. A roll bar (not shown) may be provided for increased safety. A cutting system 60 incorporating the invention is positioned in front of the machine 32. As will be explained more fully hereinafter, the cutting system 60 incorporates a plurality of individual cutting units 102 that are interconnected in a unique manner which maximizes operational efficiency while providing a high quality of cut on a variety of terrain. Reference will only be made in this description to preferred rotary cutting units 102, although the application of the present invention to other cutting unit configurations, e.g., reel or flail, may also be practicable.

The cutting system 60 of the present invention includes a plurality of individual rotary cutting units 102. Each cutting unit 102 includes a rotary cutting blade 114 operatively driven by a hydraulic motor 74. Ground engaging castor wheels 80 are attached to the cutting units 102 and generally allow the cutting units 102 to roll across the terrain. An important aspect of this invention is a unique coupling means 140 for interconnecting the individual cutting units 102. The coupling means 140 includes a span member 144 and a pair of hinging means 150 for pivotally connecting the span member 144 to the adjacent cutting units 102. As will be discussed herewithin, the coupling means 140 allow the individual cutting units 102 to display a degree of independent relative motion. As a result, the individual cutting units 102 of the present invention are able to generally follow ground variations irrespective of the orientation of both the overall machine 32 and the neighboring cutting units 102. Thus, the cutting system 60 including this unique coupling means 140 is provided a degree of articulation whereby the adjacent cutting units 102 are generally allowed to follow the ground contours passing beneath each cutting unit 102. An additional aspect of the coupling means 140 of this invention, to be described more fully herewithin, is that the relative motion of adjacent cutting units 102 is confined to be generally pivotal is about a pivot point 184 located between the adjacent cutting units 102. Still another aspect of this invention is that the relative motion of adjacent cutting units 102 generally includes both "pitching" and "rolling" type motions (to be described hereinafter). The improved cutting system 60 is realized by a selective positioning of the pivot points 184 with respect to adjacent cutting unit 102 pairs. An angular limiting means 180 can be provided between adjacent cutting units 102 for limiting the range of motion between adjacent cutting units 102. Also, a locking means 220 may be provided for selectively restraining the rotational motions between adjacent cutting units 102.

Referring again to FIG. 1, the cutting system 60 is mounted on outer ends of two lift arms 62 which provide means for raising and lowering the cutting system 60 and for further transferring motive force to propel the cutting system 60 across the turf. The lift arms 62 are operatively coupled to a hydraulic actuator (not shown) for controlling pivotal movement thereof. The inner ends of the lift arms 62 are pivotal about an axis generally transverse to the direction of motion such that the outer ends of lift arms 62 and the cutting system 60 pivot between raised and lowered positions. The two lift arms 62 are generally independently freely pivotal when the cutting unit 102 is lowered into operation so as not to resist or impede the cutting units 102 from following ground contours, i.e., in operation the cutting system 60 is not supported by the lift arms 62 but is otherwise supported by ground following castor wheels 80. Raising the cutting units 102 for loading or transport of the mowing machine 32 can be facilitated by a locking mechanism 220, described hereinafter, for selectively restricting the relative motions between adjacent cutting units 102 such that the cutting system 60 is substantially rigid across its width. Castor wheels 80 are connected at the outer ends of castor support arms 84. The castor support arms 84 are rigidly affixed at inner ends to the cutting units 102 and are distributed generally equally among the cutting units 102 to support the entire cutting system 60 and to allow the cutting system 60 to flexibly accommodate undulations in the turf. In a manner well known to those skilled in the art, castor wheel 80 assemblies can further include means for adjusting the height of cut from a minimum to a maximum height.

Figure 9:
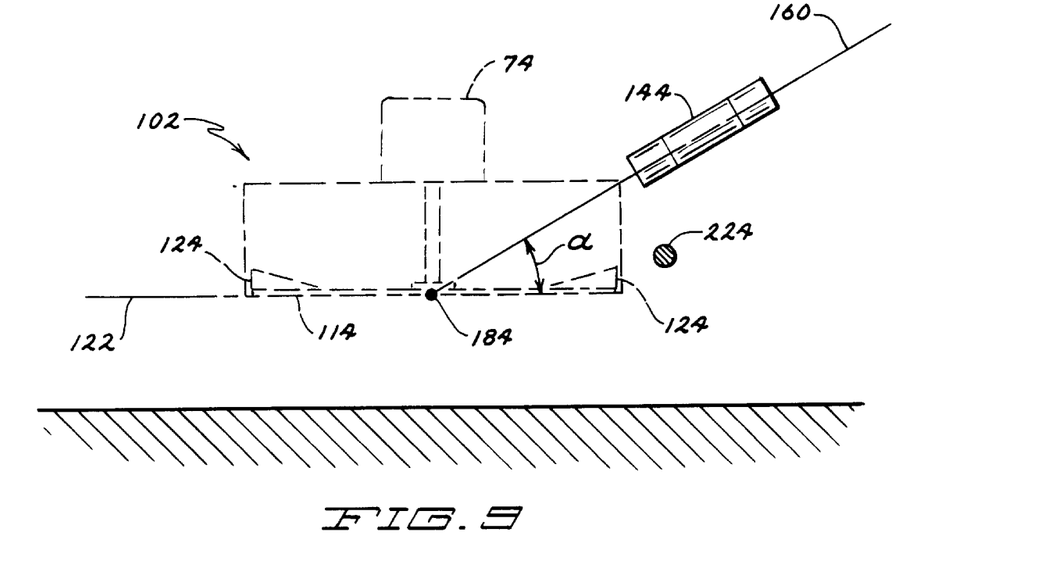
FIG. 9 is a cross-sectional view taken along lines 9—9 of FIG. 8, particularly illustrating the angular orientation of the span member and the location of the virtual pivot points with respect to the cutting units.

In further accordance with the preferred construction and with particular reference to FIG. 9, carried underneath each cutting unit 102 is a cutting blade 114 operatively driven by a hydraulic spindle drive motor 74. The hydraulic spindle motors 74 are operatively connected to a main hydraulic system (not shown) of the mowing machine 32 in a manner well known to those skilled in the art. Each blade 114 rotates about a center of rotation 115 in a cutting plane 122 which is substantially horizontal when the cutting unit 102 is on level terrain. Cutting blades 114 rotate to contact and sever standing grass in a cutting plane 122 determined by the height of the cutting unit 102 relative to the ground. Although the preferred construction includes hydraulic means for driving the cutting blades 114, alternative drive approaches may be practicable including a drive arrangement consisting of a system of belts and pulleys which transfer power from a power takeoff shaft, or a drive arrangement including one or more electric motors operatively coupled to the cutting blades 114 and powered from a generator or by battery.

Figure 2:
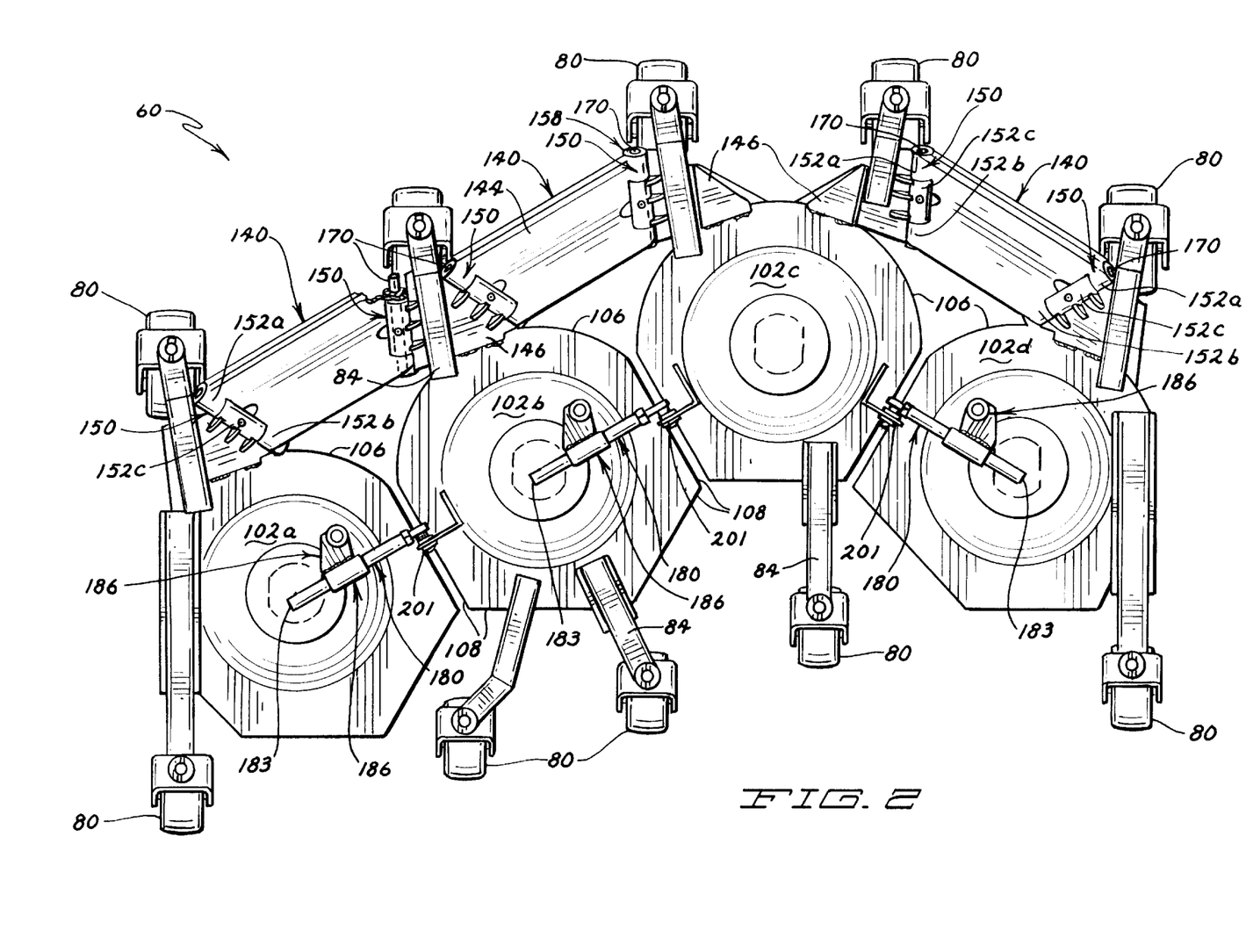
FIG. 2 is a top plan view of the cutting system of FIG. 1, particularly showing the cutting units and the coupling means between adjacent cutting units.
Figure 3:
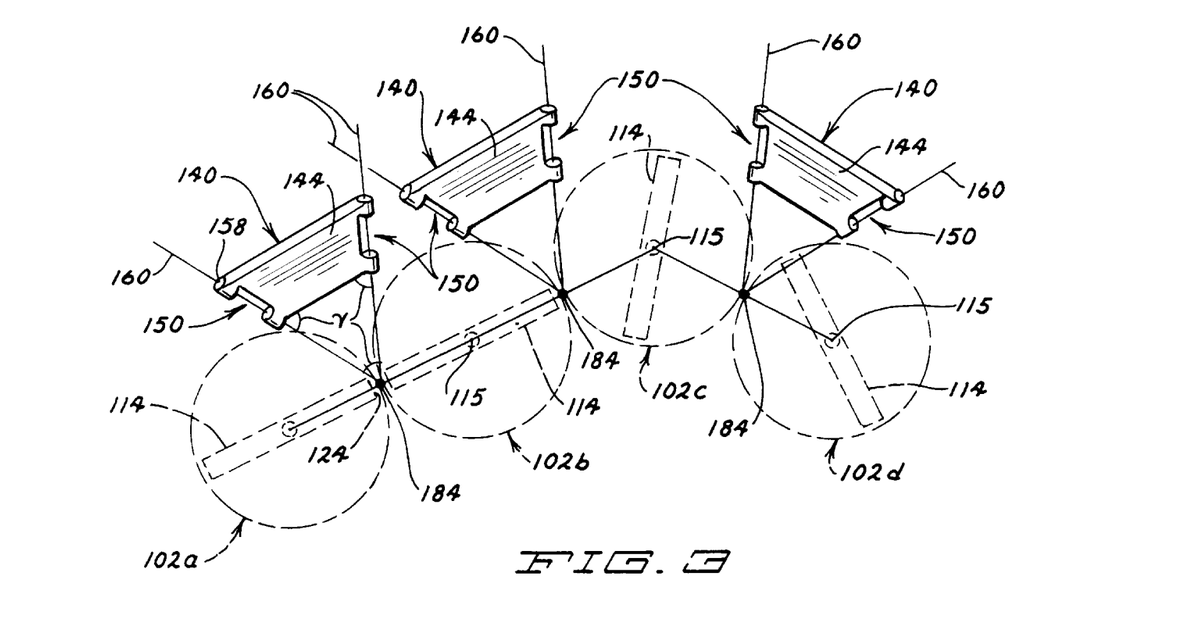
FIG. 3 is a top plan view of the cutting system according to the present invention, particularly illustrating the positioning of the span members and virtual pivot points with respect to the cutting units.
Figure 4:
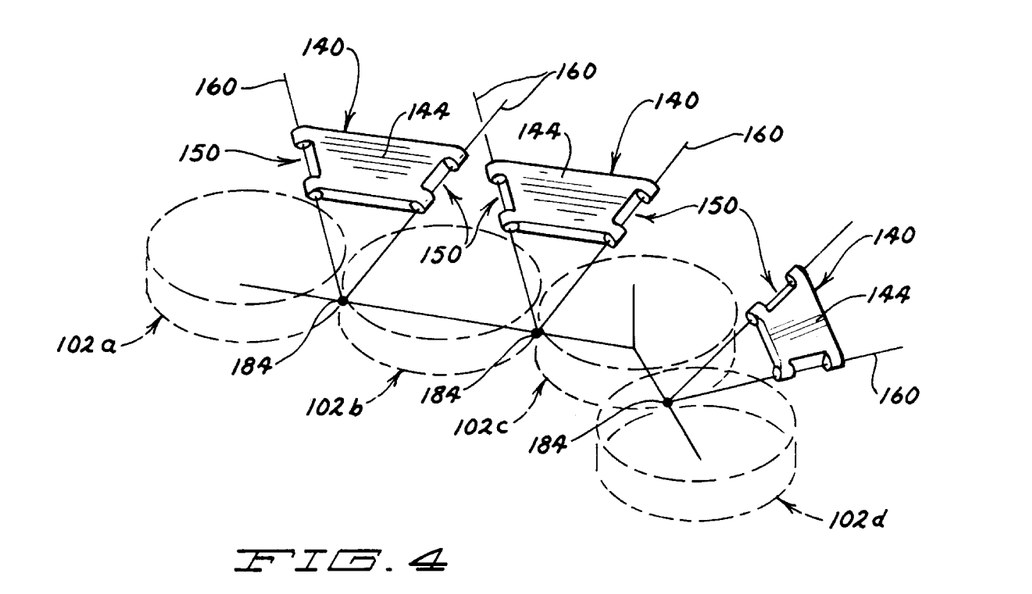
FIG. 4 is a perspective view of the cutting system of FIG. 3, particularly showing the location of the virtual pivot points with respect to the cutting units.

Referring now to FIGS. 1 and 2, the preferred cutting system 60 of the present invention includes four generally circular interconnected cutting units 102(a,b,c,d) extending generally laterally across and forward of the traction vehicle 34, in a generally side-by-side manner. Preferably right middle 102c and left side 102a cutting units are set slightly forwardly and rearwardly, respectively, from the other cutting units 102 (as viewed by the operator) to allow the blades 114 to overlap but not intersect, generally ensuring that no uncut grass strips will be left between blades 114. At the same time, this longitudinal offset ensures that the blades 114 never contact each other, thereby requiring no synchronization between blade drive units 74. Other cutting system 60 configurations would be possible, for example, cutting units 102 could be aligned oblique to the direction of machine 32 motion rather that being staggered about a line relatively perpendicular to the direction of motion. Each cutting unit 102 includes a superstructure or "frame" which in the case of preferred rotary cutting units is a housing, generally formed with a horizontally extending top wall 105 and generally vertically extending side walls 104 extending downwardly from and around the periphery of top wall 105. The side walls 104 further define a generally circular front surface 106 and a plurality of chordal faces 108. Opposing chordal faces 108 between adjacent cutting units 102 are generally parallely aligned.

Referring now to FIG. 2, a significant aspect of the present invention is a unique configuration of interconnecting adjacent cutting units 102. The present invention includes a pair of adjacent cutting units 102 interconnected through a unique coupling means 140. Coupling means 140 includes a span member 144 interposed between the adjacent cutting units 102, and a pair of hinging means 150 pivotally connecting the span member 144 to the adjacent cutting units 102 at hinge support members 146. Span member 144 is preferably generally rectangular having a length that substantially exceeds both its width and thickness. Preferably, span member 144 is a planar steel weldment of sufficient strength and rigidity to limit both torsional and linear deflections. Alternatively, span member 144 may be a single piece ductile iron casting incorporating appropriate casting design (webbing, filleting, ribbing, etc.). Span member 144 can be cast ductile iron grade 4512, Type G, hardness 156–217 BHN 4.80–4.10 BID. Hinge support members 146 are preferably steel weldments of generally pyramidal form, projecting upwardly and forwardly from the circular front surface 106 and top wall 105 of each cutting unit 102 and are rigidly attached at a first fixed end with welds. Hinge support members 146 are preferably formed of 7 gauge HRPO steel. Each hinging means for pivotally connecting each span member 144 to the support members 146 of adjacent cutting units 102 can include a linear hinge 150. Each linear hinge 150 includes a plurality of hinge hubs 152 and an elongate hinge pin 170. Formed as part of each hinge hub 152 is a substantially cylindrical perforation sized to receive the elongate hinge pin 170. In this preferred embodiment, upper and lower hinge hubs (152 a,b) are formed as part of the longitudinal ends of each span member 144. A third adjoining central hinge hub portion 152c is formed as part of the hinge support member 146 at a second end spaced away from the first fixed end. The linear hinge 150 is thereby formed by inserting the elongate hinge pin 170 through upper 152a, central 152c, and lower 152b hinge hub perforations 158. Preferably, the hinge pin 170 frictionally engages upper and lower hubs (152 a,b) of span member 144, with the center hub portion 152c generally freely journalling elongate hinge pin 170. A hinge axis 160 is substantially co-linear with the longitudinal axis of hinge pin 170 when positioned within the hub 152. FIGS. 3–9 show the hinge axes 160 of the preferred embodiment from a variety of angles. Readily apparent to those skilled in the art, each linear hinge 150 permits one degree of relative freedom between the span member 144 and the cutting unit 102, the relative motion being pivotal about the hinge axis 160. Preferably, each hinging means of this invention for interconnecting adjacent cutting units 102 includes a linear hinge 150 formed of hubs 152 having a perforate part 158 and an elongate pin 170. However, alternative linear hinge configurations are apparent to the Applicants. For instance, each linear hinge could include a pair of ball joints disposed generally in place of the upper and lower hubs of the preferred span member, with opposing ends of the ball joint being carried by the hinge support member 146 of the cutting unit 102 and the span member 144. The hinge axis of this alternative linear hinge would pass through the centers of the ball joints.

It should be apparent that the spatial position of each hinge axis 160 with reference to the cutting system 60, as a geometric function of the cutting unit 102, span member 144, and hinge support member 146 structure, may generally be arbitrarily chosen. Several advantages of the present invention are derived from the selective positioning of the two hinge axes 160 associated with each span member 144 and corresponding adjacent cutting units 102. Geometric descriptions of the two lines containing the hinge axes 160 associated with each span member 144 include: 1) parallel and non-coincident lines (no points in common); 2) parallel and coincident (all points in common); 3) non-parallel and intersecting (one point in common); and 4) non-parallel and non-intersecting (skew). One aspect of the present invention is a cutting system 60 interconnected with the above described coupling means 140 wherein the hinge axes 160 of each span member 144 are non-parallel (skewed or co-planar). Another aspect of the present invention, and one which is reflected in the preferred embodiment, includes hinge axes 160 of each span member 144 which are non-parallel and substantially intersecting. Kinematic analysis reveals that by selectively positioning the two hinge axes 160 associated with each span member 144 such that the hinge axes 160 are substantially directed to intersect at a point, the motion of the adjacent cutting units 102 is constrained such that the associated adjacent cutting units 102 generally rotate relative to each other about that point, i.e., a pivot point 184. The beneficial consequences of such a pivot point 184, including a reduction in the tip-to-tip distance variation between adjacent cutting blades 114 and, in a preferred embodiment, a provision of an additional degree of freedom allowing the cutting units 102 to display a "pitching" motion, will be described hereinafter.

The advantages of the present invention can best be understood by viewing a pair of adjacent cutting units 102 and a span member 144 interconnected in the above described manner as a three-part mechanical linkage, with the cutting units 102 considered the outer links, the span member 144 the center link, and the linear hinge 150 as the joint type. To begin the analysis, the degrees of freedom enumerating the possible relative independent motions between the outer links (adjacent cutting units 102) can be determined from Gruebler's Equation:

$$\text{degrees of freedom} = F = 3(n-1) - 2f1$$

where n is the number of links and f1 refers to the number of joints of one degree of freedom. Reference for additional discussion may be made to Erdman and Sandor, *Mechanism Design: Analysis and Synthesis*, pp.16 et seq. (1984). For the three-part mechanical linkage including a pair of adjacent cutting units 102 interconnected in the above described manner with a pair of linear hinges 150 to a span member 144, n and f1 are equal to 3 and 2, respectively. Application of Gruebler's Equation to this three-part linkage of the present invention reveals that 2 degrees of freedom are permitted between the outer links (adjacent cutting units 102). Contrast this with the single degree of freedom approaches of the prior art, where adjacent cutting units 102 might be merely interconnected with a single linear hinge 150. See FIG. 12. There, the single degree of freedom generally allows relative rotation between adjacent cutting units 102 about a hinge axis 160 parallel to the direction of travel. Here however, the coupling means 140 of the present invention, including the span member 144 and a pair of linear hinges 150 each permitting generally one degree of freedom, yields a system having two degrees of freedom between the outer interconnected links (adjacent cutting units 102). Another important aspect of the present invention is that the two degrees of freedom provided by the span member 144 interconnection can be predetermined to realize the cutting system 60 with improved operational efficiency and quality of cut.

Again, the degrees of freedom refer to the number of relative independent motions permitted between two given points on a mechanical linkage. The relative independent motions may be translational or rotatational motion, or a combination thereof. Unique to this invention is the fact that by positioning the linear hinges 150 such that the hinge axis 160 of each span member 144 and associated cutting units 102 substantially cross or intersect at a pivot point 184 the relative motion between adjacent cutting units 102 is generally constrained to be rotational about that pivot point 184. As can be appreciated by those skilled in the art, by directing the hinge axes 160 to cross or intersect at a pivot point 184 the two degrees of freedom determined from Gruebler's mobility equation are fixed to generally permit rotational motion between adjacent cutting units 102 about two independent axes centered at the pivot point 184. For the preferred embodiment, the two independent axes include a generally horizontal longitudinal axis in the direction of machine 32 travel, and a generally horizontal transverse axis perpendicular to the longitudinal axis. Relative rotational motion between adjacent cutting units 102 about the horizontal transverse axis can be described as a "pitching" type motion, while relative rotational motion about the longitudinal axis can be termed "rolling" motion. In similar regard, relative rotational motion about a third independent axis (vertical axis) would be termed "Yawing" motion. The coupling means 140 of the preferred embodiment, including the span member 144 and a pair of linear hinges 150, wherein the associated hinge axes 160 are directed to generally intersect at a pivot point 184, constrains the adjacent cutting units 102 to display "pitching" or "rolling" type rotational motions, or a combination thereof. The coupling means 140 of the preferred embodiment substantially minimizes both translational and "yawing" type motions between adjacent cutting units 102. Simply put, with the pivot point 184 as a reference the motions of adjacent cutting units 102 are generally rotational about the pivot point 184 (i.e., generally no translational relative motion). The pivot points 184 may further be defined as imaginary or virtual since each pivot point 184 may be physically separated from both the span member 144 and the associated cutting units 102. Contrast this with another 2 degree of freedom linkage, a common Hooke or Cardan universal joint, where the pivot point is generally centered within the joint structure.

Figure 5:
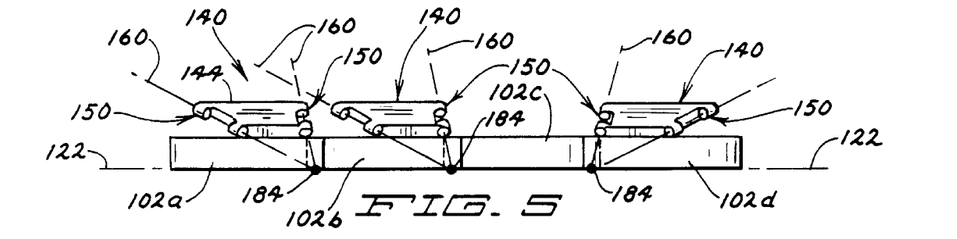
FIG. 5 is a rear elevation view of the cutting system of FIG. 3, particularly depicting the orientation of the cutting system on level terrain.
Figure 6:
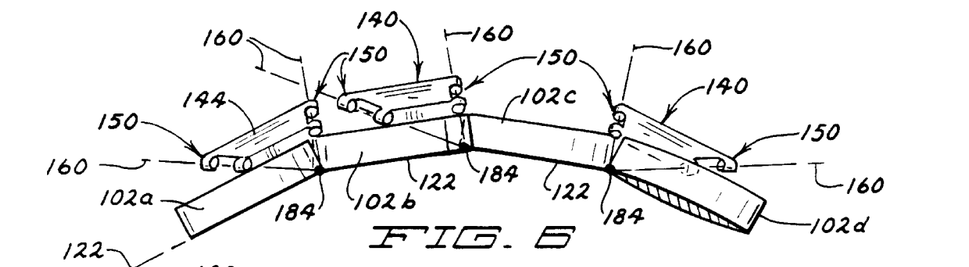
FIG. 6 is a rear elevation view of the cutting system of FIG. 3, particularly depicting the orientation of the cutting system on uneven terrain.
Figure 7:
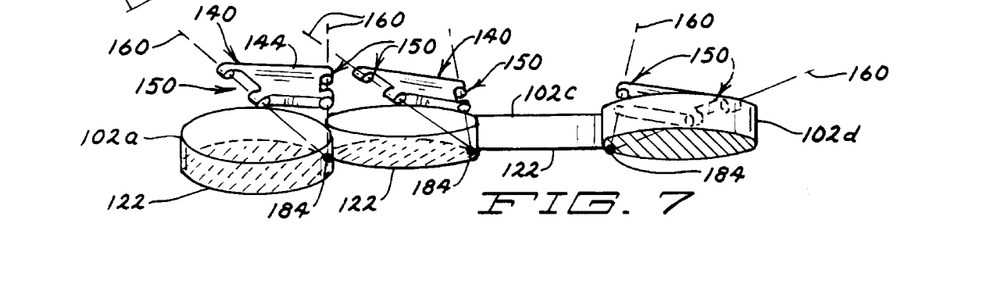
FIG. 7 is a rear elevational view of the cutting system of FIG. 3, particularly depicting the cutting system on uneven terrain.

FIGS. 3–9, depicting the cutting system 60 from a variety of views, especially illustrate the relationship between the span member, the hinge axes 160, and the cutting units 102. As particularly depicted in FIGS. 5 and 9, the hinge axes 160 of each span member 144 and associated cutting units 102 are directed to generally intersect at the virtual pivot point 184 between the adjacent cutting blades 114 and approximately at the cutting plane 122 level in which the cutting blades 114 rotate when the cutting units 102 are in a substantially horizontal orientation (in such a case cutting planes 122 are co-planar and all virtual pivot points 184 are generally contained within the cutting plane 122). As shown in FIGS. 6 and 7, with the cutting system 60 oriented on uneven terrain, each virtual pivot point 184 is generally located between the adjacent cutting blades 114 and approximately at the intersection of adjacent cutting planes 122 (in such cases the line intersections of adjacent cutting planes generally contain the associated virtual pivot point 184). The present invention includes three virtual pivot points 184, one for each of three span members 144. With specific reference to FIG. 3, the hinge axes 160 and associated span member 144 outline a generally equiangular triangle when viewed from above, i.e., the included angles γ are approximately 60 degrees. Shown in FIG. 9, the hinge axes 160 and span member 144 are substantially co-planar with the preferred angle of inclination, α, of approximately 25 degrees with respect to the level ground.

An important benefit of the cutting system 60 of the present invention is the minimization of the variation in the tip-to-tip distance between adjacent cutting blades 114 (the D distance). FIG. 12 diagrammatically illustrates common prior art single degree of freedom linear hinge approaches of interconnecting adjacent cutting units 102. The 0 distance is shown with a relatively large variance in FIG. 12(a, b, and c) as the prior art cutting units 102 traverse uneven terrain. This β distance variation is a result of the prior art pivot point 150 being located a relatively large distance above the cutting blades 114. The cutting system 60 of the present invention substantially eliminates the variation in the β distance by positioning the virtual pivot point 184 between the cutting blades 114 and at a cutting plane 122 level when the cutting system 60 is on level ground. For a given degree of cutting unit 102 roll, variation of the β distance for the present invention is less than that of the prior art cutting systems since the cutting blade tips 124 of the present invention are substantially closer to the virtual pivot point 184 about which they rotate. Adjacent cutting unit 102 stagger or offset may be optimized in the present invention leading to a cutting system 60 of improved efficiency.

Another important benefit of a preferred cutting system 60 according to the present invention is the provision of an additional degree of freedom between adjacent cutting units 102. The adjacent cutting units 102 of the present invention are constrained by the span member 144 and hinging means 150 to display generally two degrees of freedom. Pitching, rolling, and yawing motions between adjacent cutting units 102 describe relative pivotal motions about transverse, longitudinal (in the direction of travel), and vertical axes, respectively. Cutting units 102 interconnected by a preferred hinging mechanism of the present invention generally display a beneficial combination of both rolling and pitching motions relative to one another. Yawing motions, generally regarded by those skilled in the art as undesirable for rotary mowers, are substantially nonexistent in the cutting system 60. FIGS. 5–7 depict the cutting system 60 as viewed from behind in operation over flat and uneven terrain and show the relative orientations that the cutting units 102 may exhibit. FIG. 5 specifically depicts orientation of the cutting system 60 positioned on level ground with all cutting planes 122 being generally co-planar. FIGS. 6 and 7 depict the cutting system 60 in operation over uneven terrain and show the orientation of the cutting units 102 after both pitching and rolling motions. FIG. 6 depicts the cutting system 60 in operation over a small hill where generally the individual cutting units 102 are allowed to follow the ground contours beneath each unit with adjacent cutting units 102 oriented after displaying "rolling" motions. Cutting unit 102d also evidences a small degree of downward "pitching" with respect to the other cutting units 102, as the front portion of the cutting unit 102d is slightly downturned. FIGS. 5–7 all show that the motion between adjacent cutting units 102 is pivotal about the virtual pivot points 184. FIGS. 6 and 7 also show that the virtual pivot points 184 of this preferred embodiment are located between adjacent cutting units 102 at generally the intersection of adjacent cutting planes 122. FIG. 7 specifically illustrates cutting unit 102d oriented during a downward pitch motion relative to adjacent cutting unit 102c. FIG. 7 also depicts cutting unit 102a with a small degree of both upward "pitch" and downward "roll" relative to adjacent cutting unit 102b. Similarly, cutting unit 102b is depicted with a small degree of both upward pitch"and downward toll" relative to adjacent cutting unit 102c. Thus the preferred cutting system 60 of the present invention includes individual cutting units 102 which are constrained by the span member 144 and the hinge means 150 to display two degrees of rotational freedom, the resultant permitted relative motions between adjacent cutting units 102 being generally a combination of rolling and pitching with generally no yawing or translational motion between adjacent cutting units 102.

Figure 8:
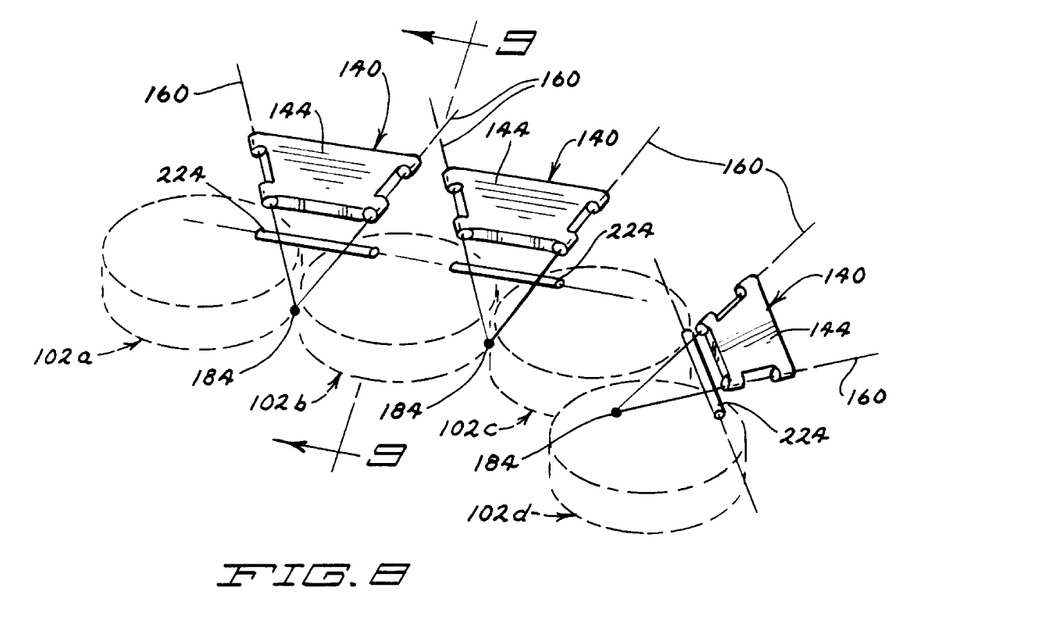
FIG. 8 is a perspective view of the present invention particularly showing the orientation of the span members and locking pins with respect to the cutting units.

Referring now to FIGS. 1, 8 and 9, cutting system 60 also includes a locking means 220 for selectively constraining the pivotal movements between adjacent cutting units 102. The locking means 220 rigidifies the cutting system 60 along the transverse width by generally preventing the rotational motions of adjacent cutting units 102. The locking means 220 may be utilized when transporting or loading the machine 32 to increase the ground clearance of the raised cutting system 60 by preventing overall bowing of the cutting system 60 along a transverse axis. Engagement of the locking means 220 also generally limits oscillations between the raised cutting units 102 during transit from one work area to another. The preferred locking means 220 includes two locking projections 222 each positioned on adjacent cutting units 102 and an elongate locking pin 224. Referring again to FIG. 1, each locking projection 222 depends from the circular front surface 106 of the cutting unit 102 and has a generally cylindrical receiving surface 228 sized to engage the locking pin 224 over a portion of the locking pin 224 length. The locking pin 224 is selectively maintained between the locking projections 222 during the locked mode of operation. As shown in FIG. 1 (where the locking means 220 is engaged to constrain adjacent cutting units 102), the locking projections 222 of adjacent cutting units 102 are oppositely positioned with the cylindrical receiving surfaces 228 of adjacent locking projections 222 generally linearly aligned so as to permit the locking pin 224 to engage both receiving surfaces 228 of adjacent locking projections 222 in the is 5 locking mode of operation, whereby the pivotal motions between adjacent cutting units 102 are substantially constrained. The unlocked mode of operation is realized by removing the locking pin 224 from at least one of the locking projections 222 and thus allowing the adjacent cutting units 102 to display the full range of motion. Referring now to FIGS. 8 and 9, the locking pins 224 orientation with respect to the cutting units 102 is shown.

Alternative locking means 220 may also include a hook and chain arrangement positioned between adjacent cutting units 102, wherein engagement of the chain secured to a first cutting unit 102 with a hook secured on a second adjacent cutting unit 102 operatively constrains the adjacent cutting units 102.

Figure 10:
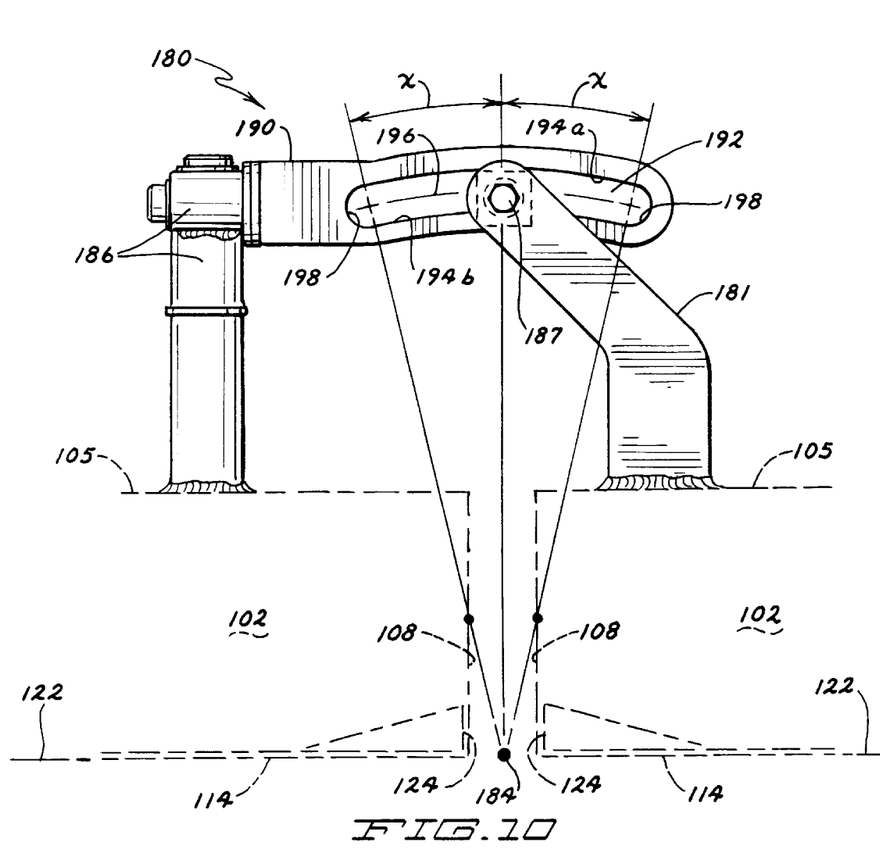
FIG. 10 is a side elevational view of the present invention, particularly showing the angular limiting means.
Figure 11:
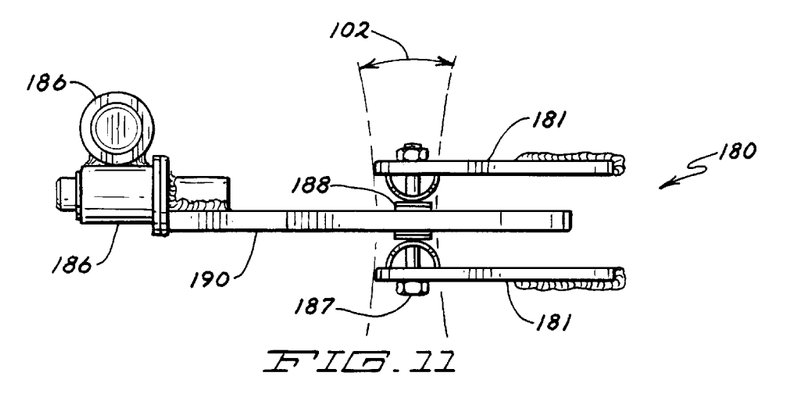
FIG. 11 is a top view of the cutting system of FIG. 10.

Another aspect of the present invention, and one which is reflected in the preferred embodiment, is an angular limiting means 180 for restricting the range of motion between adjacent cutting units 102. Applicants have determined that a preferable approximately 30 degree range of pivotal motion between adjacent cutting units 102 helps to achieve a high quality of cut while eliminating the possibility of adjacent cutting unit 102 contact during higher angle motions. Referring now to FIGS. 10 and 11, the preferred angular limiting means 180 is shown secured to the top wall 105 of adjacent cutting units 102. The angular limiting means 180 includes a pair of similar divided follower arms 181 each fixedly fastened at a proximal end to the top wall 105 of a first cutting unit 102 and each having an aperture at a distal end; a following pin 188 having a concentric bore interposed between the follower arms 181; a fastening means 187 adapted to pass through the apertures of the divided follower arms 181 and through the concentric bore of the following pin 188 for journally securing the following pin 188; and a complementary limiting member 190 rotatably fastened to a second adjacent cutting unit 102 and having an arcuate aperture 192 including a center portion 196 and outer stop portions 198 configured to receive the following pin 188, whereby the rotational motion of adjacent cutting units 102 beyond a normal operating range is impeded by the following pin 188 contacting an outer stop portion 198 of the arcuate aperture 192. Limiting member 190 is rotatably secured to the cutting unit 102 through two generally orthogonally aligned pivot hubs 186 which provide the limiting member 180 with two degrees of freedom. The arcuate aperture 192 is elongate with an arcuate upper 194a and lower 194b faces; each face 194 circumferentially disposed approximately about the virtual pivot point 184 and with a distance between faces sized to confine the following pin 188. The length of the elongate aperture between outer stop portions 198 is predetermined to provide the preferred approximately 30 degrees of relative motion between adjacent cutting units 102, or approximately 15 degrees of both clockwise and counter-clockwise roll (illustrated with angle $\chi$ in FIG. 10). Aside from impeding the range of motion of adjacent cutting units 102 beyond the preferred rotational amount, the limiting means 180 does not otherwise interfere with the pitching and rolling motions between adjacent cutting units 102. Alternative angular limiting means 180 shown in FIGS. 1 and 2 may also include a ball joint 201 affixed at a first end to a cutting unit 102 and affixed at a second end to a slidable follower shaft 183. Follower shaft 183 is journally received into alternative pivot hubs 186, allowing follower shaft 183 to both rotate and slide with respect to pivot hubs 186.

Figure 13:
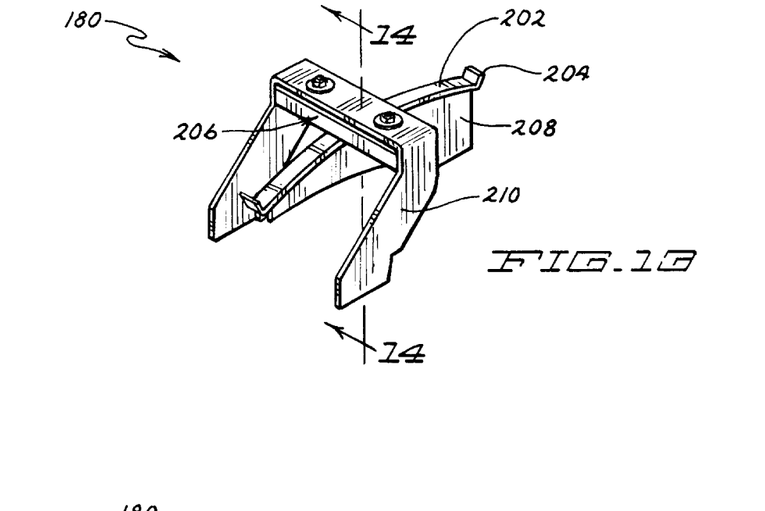
FIG. 13 is a perspective view of an alternative embodiment of the angular limiting means.
Figure 14:
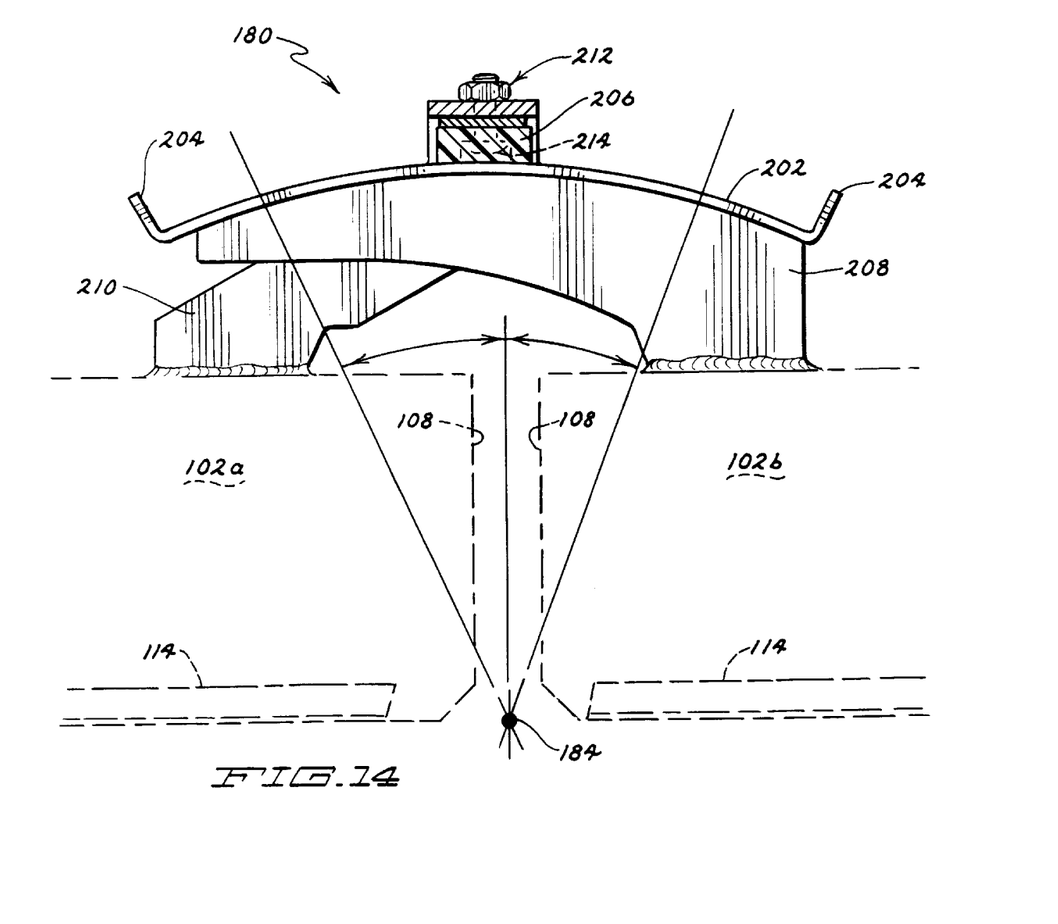
FIG. 14 is a cross-sectional view taken along lines 14—14 of FIG. 13.

Referring now to FIGS. 13 and 14, an alternative embodiment of a preferred angular limiting means 180 is shown. FIG. 13 specifically shows in perspective, viewed as from the operator, an alternative angular limiting means 180. Shown in FIG. 14, angular limiting means 180 includes an arcuate rail strap 202 and strap support 208 fixedly fastened at a first end to the top wall 105 of cutting unit 102b and extending at a second end in a cantilever fashion toward adjacent cutting unit 102a. Arcuate rail strap 202 is circumferentially located from virtual pivot point 184 and further includes at opposing ends strap stops 204. Slidably engaging arcuate rail strap 202 along its top face is slide pad 206. Slide pad 206 is removably fastened at an extending end of bracket 210. Bracket 210 is fixedly fastened at a first end to the top wall 105 of cutting unit 102a and includes a second end which extends in a cantilever fashion toward adjacent cutting unit 102b. Slide pad 206 may be formed of a suitable low-friction material, e.g., nylon, polyethylene, etc., and is replaceable during routine maintenance as required. Slide pad 206 is removably attached to the second extending end portion of bracket 210 with a pair of carriage head fasteners 212. As further illustrated in FIG. 14, each head 214 of carriage fastener 212 is recessed away from the sliding surface of slide pad 206. During operation over uneven terrain, with the motion of adjacent cutting units 102 described heretofore as rotational about the virtual pivot point 184, the slide pad 206 slidable engages rail strap 202 along its top face and between the limiting strap stops 204. The position of the angular limiting means 180 between adjacent cutting units 102 need not be directly above the described preferred virtual pivot point 184, but rather the angular limiting means 180 may be positioned ahead of or, as preferred by the Applicants, behind the virtual pivot point 184 when viewed from above. Preferably also, the bracket 210 and slide pad 206 portion of each angular limiting means 180 is positioned toward the outer ends of the cutting system 60, e.g., with reference to adjacent cutting units 102 c and d, the bracket 210 and slide pad 206 portion of the associated angular limiting means 180 is preferably secured to cutting unit 102d.

Although the present invention has been described with respect to specific embodiments thereof, various changes and modifications may be suggested to one skilled in the art, and it is intended that the present invention encompass such changes and modifications as fall within the scope of the appended claims.

We claim:

1. An improved turf mower comprising:
   a) a plurality of cutting unit frames which are movable over the ground;
   b) a plurality of cutting blades, at least one cutting blade being movably carried by each cutting unit frame;
   c) a plurality of support members each rigidly connected to one of the cutting unit frames;
   d) a span member associated with and disposed between each pair of adjacent cutting unit frames; and
   e) a pair of hinging means for pivotally connecting each span member to the support members of adjacent cutting unit frames, wherein each hinging means permits relative pivotal movement about a hinge axis, and wherein the hinge axes associated with adjacent cutting unit frames are non-parallel, whereby each cutting unit frame may display a range of independent motion relative to an adjacent cutting unit.

2. The improved turf mower of claim 1, wherein the hinge axes associated with adjacent cutting unit frames are substantially directed to intersect at a virtual pivot point, whereby the motion of adjacent cutting unit frames relative to the virtual pivot point is generally rotational.

3. An improved multi-bladed mower, which comprises:
   a) a plurality of cutting units which are movable over the ground;
   b) a plurality of cutting blades, at least one cutting blade being rotatably carried beneath each cutting unit;
   c) a plurality of support members each rigidly connected to one of the cutting units;
   d) a span member associated with and disposed between each pair of adjacent cutting units; and
   e) a pair of hinging structures for pivotally connecting each span member to the support members of adjacent cutting units, wherein each hinging structure permits relative pivotal movement about a hinge axis, and wherein hinge axes associated with adjacent cutting units are non-parallel, whereby each cutting unit may display a range of independent motion relative to an adjacent cutting unit.

4. An improved multi-bladed mower according to claim 3, wherein the hinge axes associated with adjacent cutting units are substantially directed to a virtual pivot point, whereby the motion of adjacent cutting units relative to the virtual pivot point is generally rotational.

5. An improved multi-bladed mower according to claim 4, wherein the relative pivotal movement between adjacent cutting units about the virtual pivot point is generally comprised of pitching and rolling motions.

6. An improved multi-blade mower according to claim 4, wherein each pair of hinging structures comprises a pair of elongate hinges disposed between the span member and the support members of adjacent cutting units.

7. The improved multi-bladed mower of claim 6, wherein each cutting blade establishes a cutting plane and wherein the virtual pivot point is generally located between the cutting blades and approximately at the intersection of the cutting planes.

8. The improved multi-bladed mower of claim 7, wherein each cutting blade rotates substantially about a center of rotation, and wherein the virtual pivot point of adjacent units is generally located midway between the centers of rotation of the adjacent cutting blades.

9. The improved multi-bladed mower of claim 8, wherein each span member is substantially planar having a length that substantially exceeds its width and longitudinally spaced apart ends.

10. The improved multi-bladed mower of claim 9, wherein each support member includes a first end fixed to the associated cutting unit and a second end spaced therefrom, and wherein disposed at the ends of each span member are means for defining a portion of the elongate hinge, and wherein disposed at the second end of each support member is means for defining an adjoining portion of the hinge.

11. The improved multi-bladed mower of claim 10, wherein each elongate hinge comprises axially aligned perforate parts alternately disposed at each end of the span member and the second end of each support member, and wherein an elongate pin is configured to be inserted through and engage the perforate parts of the span member and the corresponding support member, whereby between the span member and each support member a joint is formed with generally one degree of freedom.

12. The improved multi-bladed mower of claim 10, wherein the support members are disposed on and upwardly extend from the associated cutting units.

13. The improved multi-bladed mower of claim 12, wherein the support members are positioned near a forward periphery of the associated cutting units.

14. The improved multi-bladed mower of claim 13, further including at least one ground engaging castor wheel secured to each of the cutting units.

15. The improved multi-bladed mower of claim 14, further including an angular limiting means for defining a range of motion within which the rotational motion of adjacent units relative to the virtual pivot point is confined.

16. The improved multi-bladed mower of claim 15, wherein the limiting means is disposed above adjacent cutting units and comprises a limiter member rotatably attached to one of the cutting units and carrying a body forming an aperture and a following member fixedly attached at a proximal end to the adjacent cutting unit and having a following pin disposed on a distal end, wherein the following pin is configured to be received by and confined within the aperture, whereby the rotational motion relative to the virtual pivot point of adjacent cutting units beyond a normal operating range is impeded by the following pin contacting an outer stop portion of the aperture.

17. The improved multi-bladed mower of claim 15, wherein the limiting means is disposed above adjacent cutting units and comprises (I) an arcuate rail strap including opposing end strap stops supported at a fixed end upon the top wall of a cutting unit and extending in a cantilever fashion toward the adjacent cutting unit, and (ii) a slide pad supported by a bracket affixed upon the top wall of the adjacent cutting unit, whereby the slide pad generally slidably engages the rail strap along its length as the cutting unit traverses uneven terrain, and whereby the rotational motion relative to the virtual pivot point of adjacent cutting units beyond a normal operating range is impeded by the slide pad contacting a strap stop.

18. The improved multi-bladed mower of claim 17, further including a locking means for selectively limiting the pivotal movement between adjacent cutting units.

19. The improved multi-bladed mower of claim 17, wherein the locking means includes a movable locking pin and a pair of locking projections each disposed on an adjacent cutting unit for receiving at least an extending portion of the locking pin whereby adjacent units are substantially pivotally constrained when the extending portion of the locking pin is engaged into the locking projection.

20. A method of manufacturing an improved turf mower, which comprises the steps of:
   a. providing in a generally horizontal orientation at least a pair of cutting unit frames which are movable over the ground;
   b. providing at least one movable cutting blade carried beneath each of the cutting unit frames, each cutting blade establishing a cutting plane having a cutting plane level;
   c. establishing a virtual pivot point between each pair of adjacent cutting unit frames positioned between the cutting unit frames and generally at the cutting plane level;
   d. forming a plurality of support members each connected to one of the cutting unit frames;
   e. providing a span member associated with each pair of adjacent cutting unit frames;
   f. forming hinging means for establishing a pivoting connection between each support member and the associated span member, whereby the pivoting connection generally provides relative movement about a hinge axis;
   g. positioning the hinging means of adjacent cutting unit frames such that the hinge axes are substantially directed to the virtual pivot point, whereby the motion of adjacent cutting unit frames relative to the virtual pivot point is generally rotational; and
   h. providing limiting means for defining a normal operating range of motion within which the relative pivotal movement of adjacent cutting unit frames is confined.

21. An improved turf mower comprising:
   a linkage structure comprising (i) two cutting unit links each rigidly carrying support member and movably carrying a cutting blade (ii) and a coupling span link, generally interposed between the cutting unit links; and connection means provided between the coupling span link and each support member that allow generally one degree of freedom about an axis of rotation, wherein the rotational axes are positioned to generally intersect at a virtual pivot point, wherein the motion of the cutting unit links relative to the virtual pivot point is generally rotational, whereby the cutting unit links can individually follow undulations in the turf and the distance between adjacent cutting blades is relatively constant, thereby achieving a high quality of cut.

22. An improved multi-bladed turf mower, which comprises:
   a) a plurality of interconnected cutting units which are movable over the ground;
   b) a plurality of cutting blades, at least one cutting blade carried beneath each cutting unit, and each cutting blade rotating generally about a center of rotation, herein the cutting blades of adjacent cutting units can generally rotate within a cutting plane when the cutting units are substantially level;
   c) a plurality of support members each positioned on one of the cutting units, d) a span member associated with and positioned between each pair of adjacent cutting units; and
   e) a pair of hinges for connecting each span member to the support members of adjacent cutting units, wherein the hinges permit relative pivotal movement about a hinge axis, and wherein the hinge axes associated with adjacent cutting units are substantially directed to a virtual pivot point generally located midway from the centers of rotation of the adjacent cutting units and generally contained within the associated cutting plane.

23. An improved multi-bladed turf mower comprising:
   a) a traction unit;
   b) four cutting units carried by the traction unit in a substantially side-by-side orientation, whereby three pair of cutting units are adjacent;
   c) four cutting blades, one blade rotatably carried beneath each cutting unit, and each cutting blade rotating generally about a center of rotation, wherein the cutting blades of adjacent cutting units can generally rotate within a cutting plane when the cutting units are substantially level;
   d) at least six support members, each rigidly connected to one cutting unit, two support members being associated with each of the three pair of cutting units;
   e) three span members associated with and positioned between each pair of adjacent cutting units; and
   f) a pair of hinges for connecting each span member to the support members of adjacent cutting units, wherein the hinges permit relative pivotal movement about a hinge axis, and wherein the hinge axes associated with adjacent cutting units are substantially directed to a virtual pivot point generally located midway from the centers of rotation of the adjacent cutting units and generally contained within the associated cutting plane.

24. An improved multi-bladed turf mower, which comprises:
   a) a plurality of interconnected cutting units which are movable over the ground;
   b) a plurality of cutting blades, at least one cutting blade carried beneath each cutting unit, and each cutting blade rotating generally about a center of rotation, wherein each cutting can generally rotate within a cutting plane;
   c) a plurality of support members each positioned on one of the cutting units;

d) a span member associated with and positioned between each pair of adjacent cutting units; and e) a pair of hinges for connecting each span member to the support members of adjacent cutting units, wherein the hinges permit relative pivotal movement about a hinge axis, and wherein the hinge axes associated with adjacent cutting units are substantially directed to a virtual pivot point generally located midway from the centers of rotation of the adjacent cutting units and generally contained within each associated cutting plane.

25. An improved multi-bladed turf mower comprising:

a) a traction unit;

b) four cutting units carried by the traction unit in a substantially side-by-side orientation, whereby three pair of cutting units are adjacent;

c) four cutting blades, one blade rotatably carried beneath each cutting unit, and each cutting blade rotating generally about a center of rotation, wherein each cutting blade can generally rotate within a cutting plane;

d) at least six support members, each rigidly connected to one cutting unit, two support members being associated with each of the three pair of cutting units;

e) three span members associated with and positioned between each pair of adjacent cutting units; and f) a pair of hinges for connecting each span member to the support members of adjacent cutting units, wherein the hinges permit relative pivotal movement about a hinge axis, and wherein the hinge axes associated with adjacent cutting units are substantially directed to a virtual pivot point generally located midway from the centers of rotation of the adjacent cutting units and generally contained within each associated cutting plane.

* * * * *